United States Patent [19]

Itoh et al.

[11] Patent Number: 5,549,191

[45] Date of Patent: Aug. 27, 1996

[54] APPARATUS FOR TRANSFERRING CONTAINERS TO A MOVING CONVEYOR

[75] Inventors: Kosaku Itoh, Buffalo Grove; Ikuro Yokoyama, Arlington Heights; Richard Prochut, Bartlett; Jörgen Löfstedt, Palatine; Christer Nilsson, Arlington Heights, all of Ill.

[73] Assignee: Tetra Laval Holdings & Finance S.A., Pully, Switzerland

[21] Appl. No.: 315,409

[22] Filed: Sep. 28, 1994

[51] Int. Cl.[6] .................................................. B65G 47/26
[52] U.S. Cl. ........................................... 198/432; 198/429
[58] Field of Search .................................. 198/427, 429, 198/432, 436, 456, 457, 597

[56] References Cited

U.S. PATENT DOCUMENTS

| | | |
|---|---|---|
| 732,221 | 6/1903 | Potvin . |
| 1,872,686 | 8/1932 | Cundall . |
| 2,470,795 | 5/1949 | Socke . |
| 2,630,951 | 3/1953 | Slightam . |
| 2,744,610 | 5/1956 | Stiles . |
| 2,822,079 | 2/1958 | Ascani . |
| 2,827,148 | 3/1958 | Engleson et al. . |
| 2,827,159 | 3/1958 | Peteler . |
| 2,954,881 | 10/1960 | Hopton et al. . |
| 3,051,292 | 8/1962 | Sundquist et al. . |
| 3,067,851 | 12/1962 | O'Rourke, Jr. . |
| 3,179,231 | 4/1965 | Craig . |
| 3,308,922 | 3/1967 | Ellis et al. . |
| 3,360,100 | 12/1967 | Seragnoli ............................ 198/429 X |
| 3,388,815 | 6/1968 | Lingl . |
| 3,433,966 | 3/1969 | Letch et al. . |
| 3,774,370 | 11/1973 | Fried . |
| 3,854,602 | 12/1974 | Blank . |
| 3,923,144 | 12/1975 | Langen ...................................... 198/429 |
| 4,229,134 | 10/1980 | Reist . |
| 4,413,720 | 11/1983 | Pfleger . |
| 4,610,347 | 9/1986 | Inoko ................................... 198/432 X |
| 4,617,778 | 10/1986 | Blackman . |
| 4,768,642 | 9/1988 | Huntger . |
| 5,004,093 | 4/1991 | Blezard . |
| 5,044,488 | 9/1991 | Bolin . |
| 5,133,446 | 7/1992 | Draghetti ............................ 198/432 X |

FOREIGN PATENT DOCUMENTS 0356874  9/1931  United Kingdom ................... 198/429

Primary Examiner—James R. Bidwell
Attorney, Agent, or Firm—McAndrews, Held & Malloy, Ltd.; Patrick N. Burkhart

[57] ABSTRACT

A mechanism is provided for transferring containers from a packaging machine to a pair of continuously moving outfeed conveyors which then route the containers to another location in the packaging facility. The packaging machine includes a vacuum cup which carries a row of container. The vacuum cup is movable to position the row of containers in place in front of a pair of pusher plates. The pusher plates are driven transversely across the vacuum cup to transfer the containers to a pair of puller plates positioned on the opposite side of the vacuum cup. As the pusher plates extend, they push the containers against sidewalls on the puller plates, aligning the cartons in rows running parallel to the outfeed conveyors. The puller plates then move transversely to align the rows of cartons with the outfeed conveyor. Once the puller plates are aligned with the conveyors, an unloader mechanism pushes in the containers onto the outfeed conveyors.

10 Claims, 13 Drawing Sheets

APPARATUS FOR TRANSFERRING CONTAINERS TO A MOVING CONVEYOR

TECHNICAL FIELD

The present invention relates to a material handling apparatus. More specifically, the present invention relates to an apparatus for simultaneously transferring a plurality of containers onto a continuously moving outfeed conveyor.

BACKGROUND

In the packaging industry it is often necessary to transfer containers, packages and/or goods onto a moving conveyor. For example, it may be necessary to transfer filled cartons from a packaging machine onto an outfeed conveyor which then routes the containers to other locations in the packaging facility. Typically, containers are laterally loaded onto the conveyor by a mechanism which pushes them onto the conveyor from the side. One such device is illustrated in U.S. Pat. No. 4,617,778 to Blackman. Such a design is problematic because the containers often tip over when they are transferred to the moving conveyor. If the containers tip over they can jam the line, causing undesirable downtime for the packaging operation.

It is also known to provide conveyors with baskets or compartments configured to receive a preselected number of the transferred items and maintain the items in the desired orientation on the conveyor. Examples of these devices are illustrated in U.S. Pat. No. 4,768,642 to Hunter and U.S. Pat. No. 2,827,148 to Engleson et al. Although such designs can reduce the chance of container tipping, they are undesirable because the conveyors must be specifically configured to receive the transferred item. In addition, such designs increase the difficulty of timing transfer of the item onto the conveyor.

Another approach is to employ indexing or intermittently operating conveyors. A system employing intermittent conveyors is described in U.S. Pat. No. 5,004,093 to Blezard. Indexing conveyors are undesirable because they reduce the throughput time of the operation.

SUMMARY OF THE INVENTION

An apparatus is provided for transferring a plurality of containers from a support surface to a continuously moving conveyor distally located from the support surface. The apparatus includes a puller plate adapted to support a plurality of containers along a row running parallel to the conveyor. The puller plate is movable between a first position adjacent to the support surface and a second position at which the row of cartonss carried by the puller plate align with the conveyor. A pusher plate is movable across the support surface between a retracted position at which the containers carried by the support surface are positioned between the pusher and puller plates and an extended position proximal to the puller plate's first position. An unloader plate is movable along the puller plate when the puller plate is at its second position. The unloader plate is movable between a first position distal to the conveyor and a second position proximal to the conveyor. A control system actuates movement of the pusher plate from its retracted position to its extended position to push a row of cartonss onto the puller plate, movement of the puller plate from its first position to its second position to align the row of cartonss with the conveyor, and movement of the unloader plate from its first position to its second position to sequentially push the row of cartonss carried by the puller plate onto the conveyor.

In accordance with one embodiment, the control system actuates pneumatic cylinders connected to move the puller, pusher and unloader plates. A programmable controller is programmed to control the pneumatic cylinders in accordance with a predetermined timing sequence. In applications having more than one conveyor, multiple pusher plates, puller plates and unloader plates can be used to effect transfer to the conveyors.

Other objects and advantages of the present invention will become apparent upon reference to the accompanying detailed description when taken in conjunction with the following drawings.

DETAILED DESCRIPTION OF THE PREFERRED EMBODIMENTS

Figure 1:
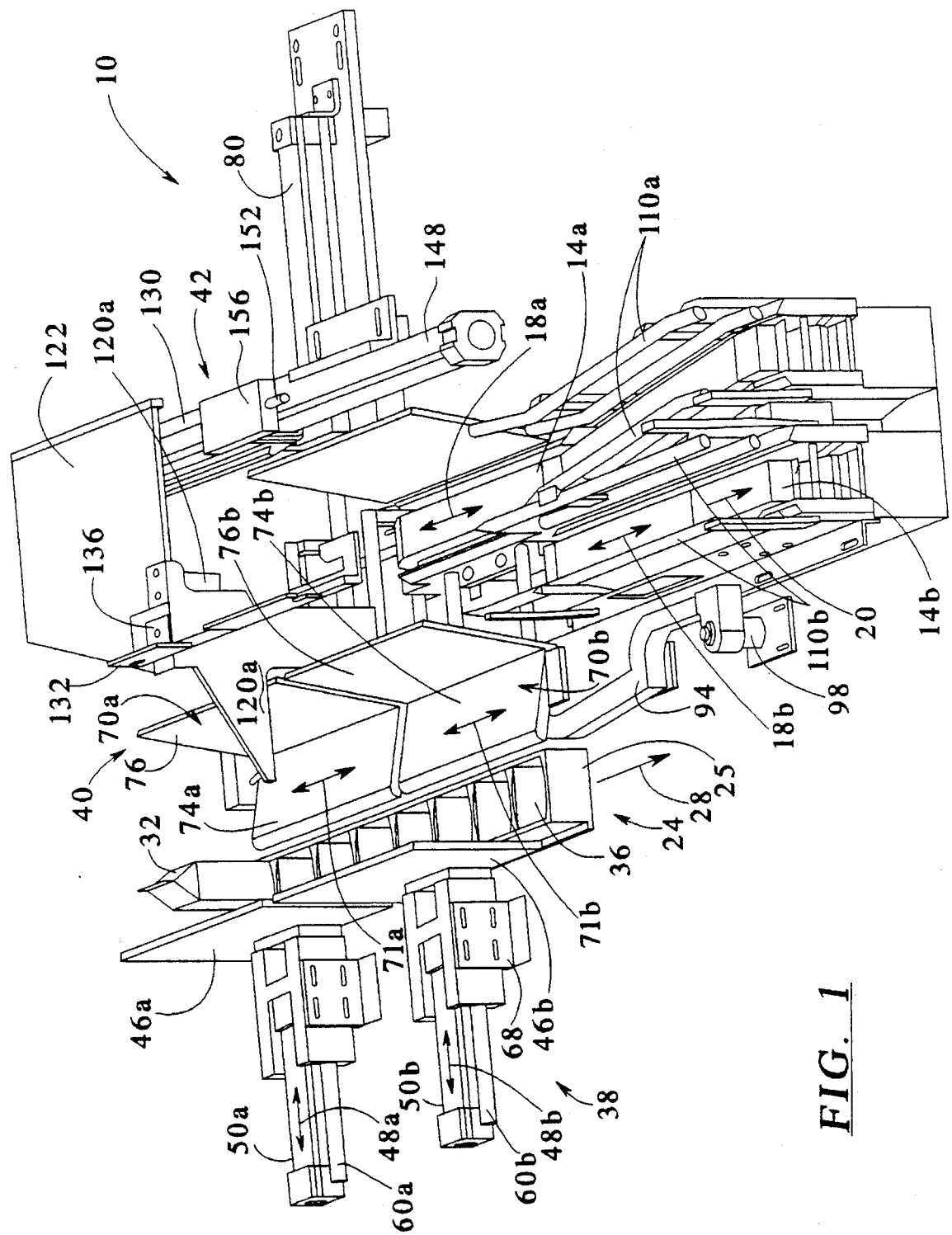
FIGS. 1–5 are perspective views of a transfer mechanism, illustrating the transfer mechanism at different stages during an operation cycle.

A transfer mechanism 10 for loading containers onto a moving conveyor is generally illustrated in FIG. 1. FIGS. 2–5 show the transfer mechanism at other stages during an operating cycle. The transfer mechanism 10 was developed to load containers from a packaging machine (not shown) onto a pair of endless belt conveyors 14a, 14b which then route the cartonss to preselected locations in the packaging facility. It should be appreciated, however, that the transfer mechanism 10 can be adapted for other applications in which it is necessary to transfer items, including containers, packages, and raw materials, onto a moving conveyor.

The conveyors 14a,14b continuously move in the direction of arrow 20. At the point of transfer, the longitudinal axis 18a,18b of the conveyors 14a,14b are parallel to each other. Two conveyors are utilized because the throughput rate of the packaging and transfer mechanisms exceed the speed of the conveyors.

The packaging machine includes a movable support 24 in the form of a vacuum cup 25 which is more fully described in U.S. application Ser. No. 08/315,403 (Corporate Docket No. TRX-0065; Attorney Docket No. 10599US01), entitled "Vacuum Bottom Former," filed on even date herewith, the disclosure of which is hereby incorporated by reference. The vacuum cup 25 is longitudinally spaced from the conveyors 14a,14b, and is adapted to carry a plurality of cartonss in a row 28 which is generally parallel to the longitudinal axis 19a,19b of the conveyors 14a,14b. For illustration purposes, one carton is shown as element 32 in FIG. 1. The cartonss are carried in carton holders 36 arranged in a row along the top of the vacuum cup 25. The vacuum cup 25 moves vertically along a pair of guide arms (not shown) between a lowered position (See FIG. 1) and a raised position (See FIG. 3). When the vacuum cup 25 reaches its lowered position, pistons (not shown) move upwardly in the holders 36 to eject the cartons from the holders. The transfer mechanism 10 then offloads the cartons from the vacuum cup 25 and transfers them onto the conveyors 14a,14b, as is explained in greater detail below.

The transfer mechanism 10 includes a pusher assembly 38, a puller assembly 40, and an unloader assembly 42. The assemblies 38-42 are mounted on a frame or base (not shown) which maintains their orientation relative to one another and relative to the vacuum cup 25 and the outfeed conveyors 14a,14b. The pusher assembly 38 includes first and second pusher plates 46a,46b, each of which is movable along an axis 48a,48b running generally perpendicular to the axis 18a,18b of a respective conveyor, 14a,14b. The pusher plates 46a,46b are movable between a retracted position (See FIG. 1) and an extended position (See FIG. 2) to push the cartons off of the vacuum cup 25 and onto the puller assembly 40. As can best be seen in FIG. 8, each pusher plate 46 has a width W which is approximately one-half the width of the vacuum cup 25, so that each pusher plate 46 "pushes" one-half of the cartons carried on the vacuum cup 25.

Figure 2:
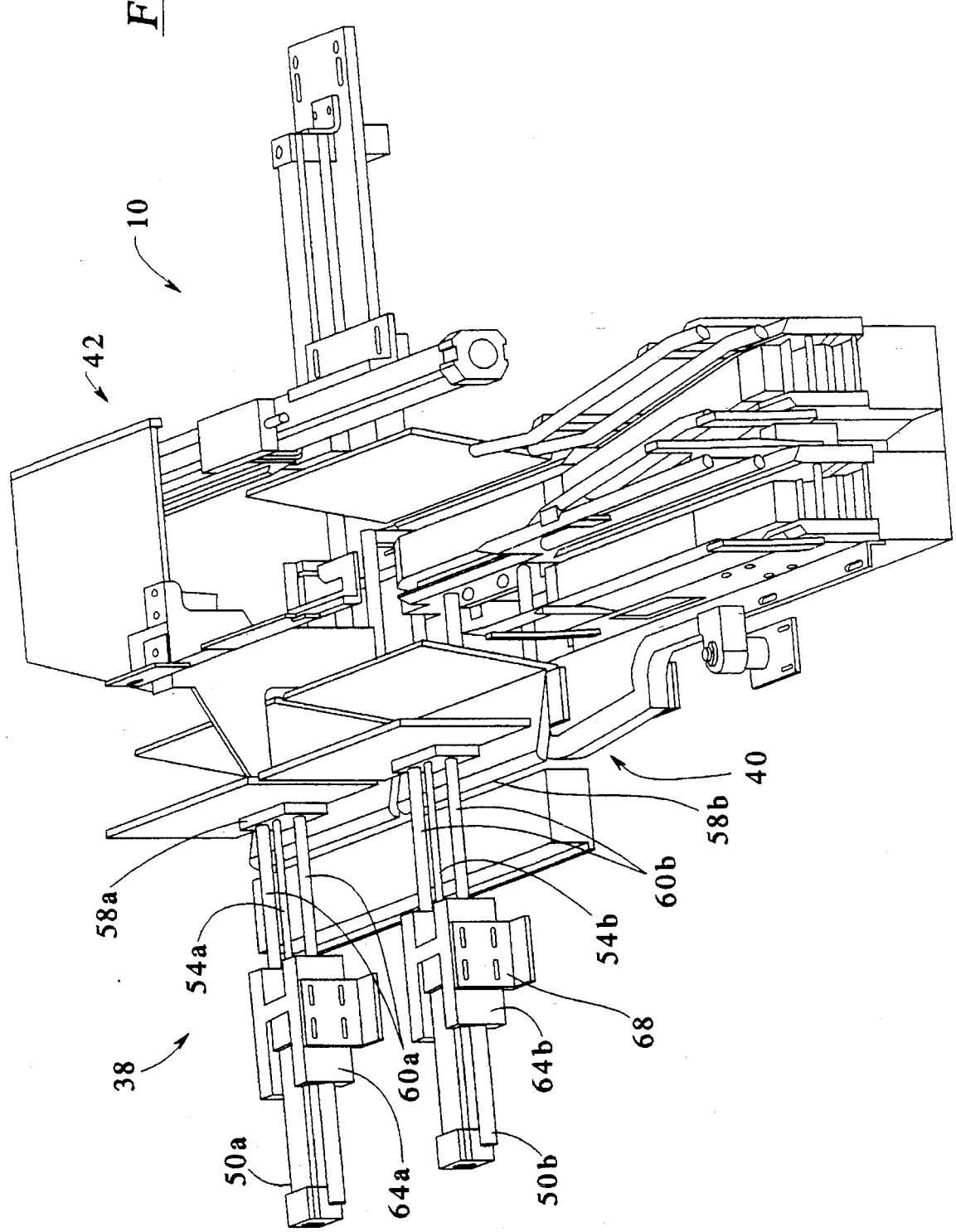
Figure 3:
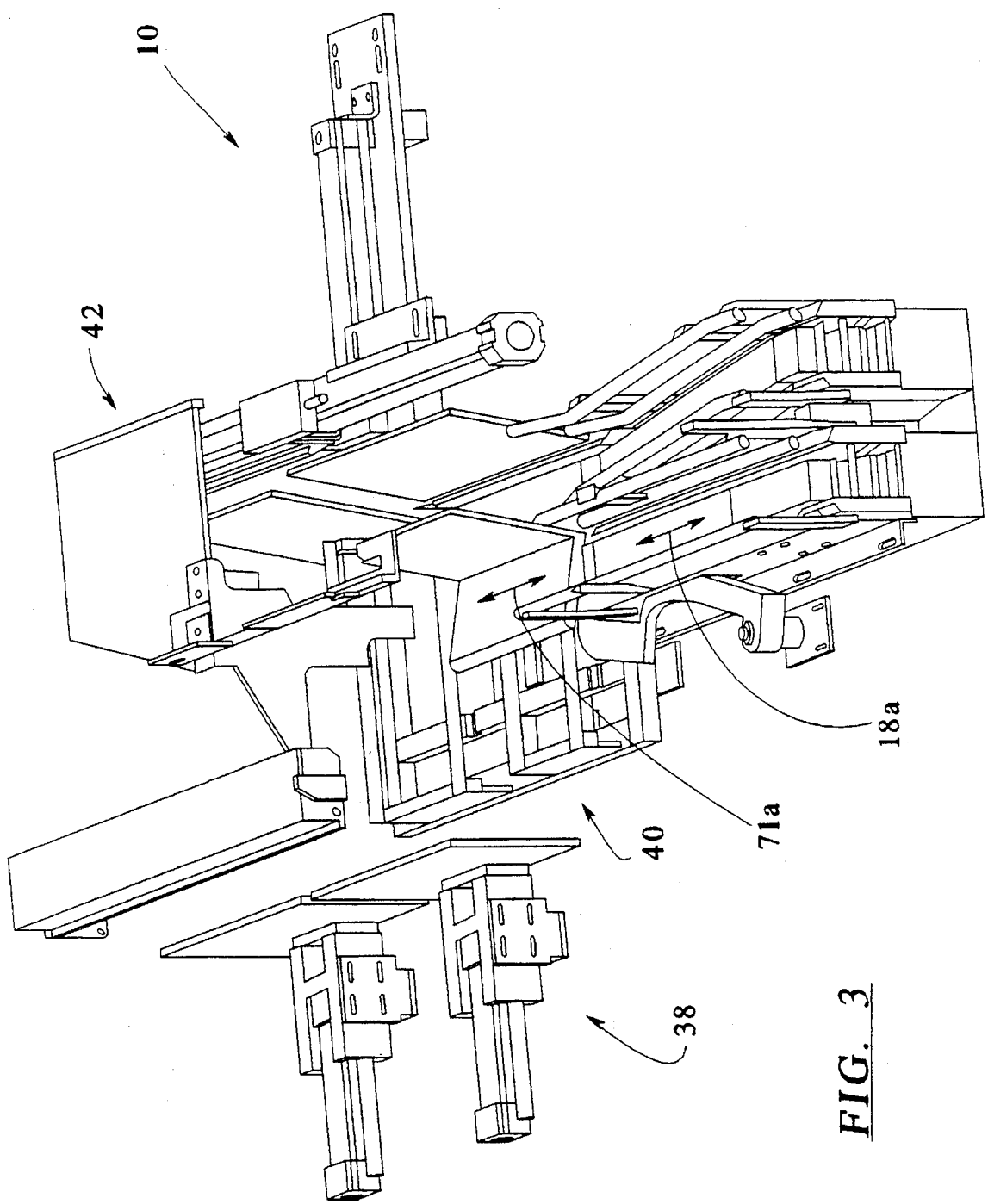
Figure 4:
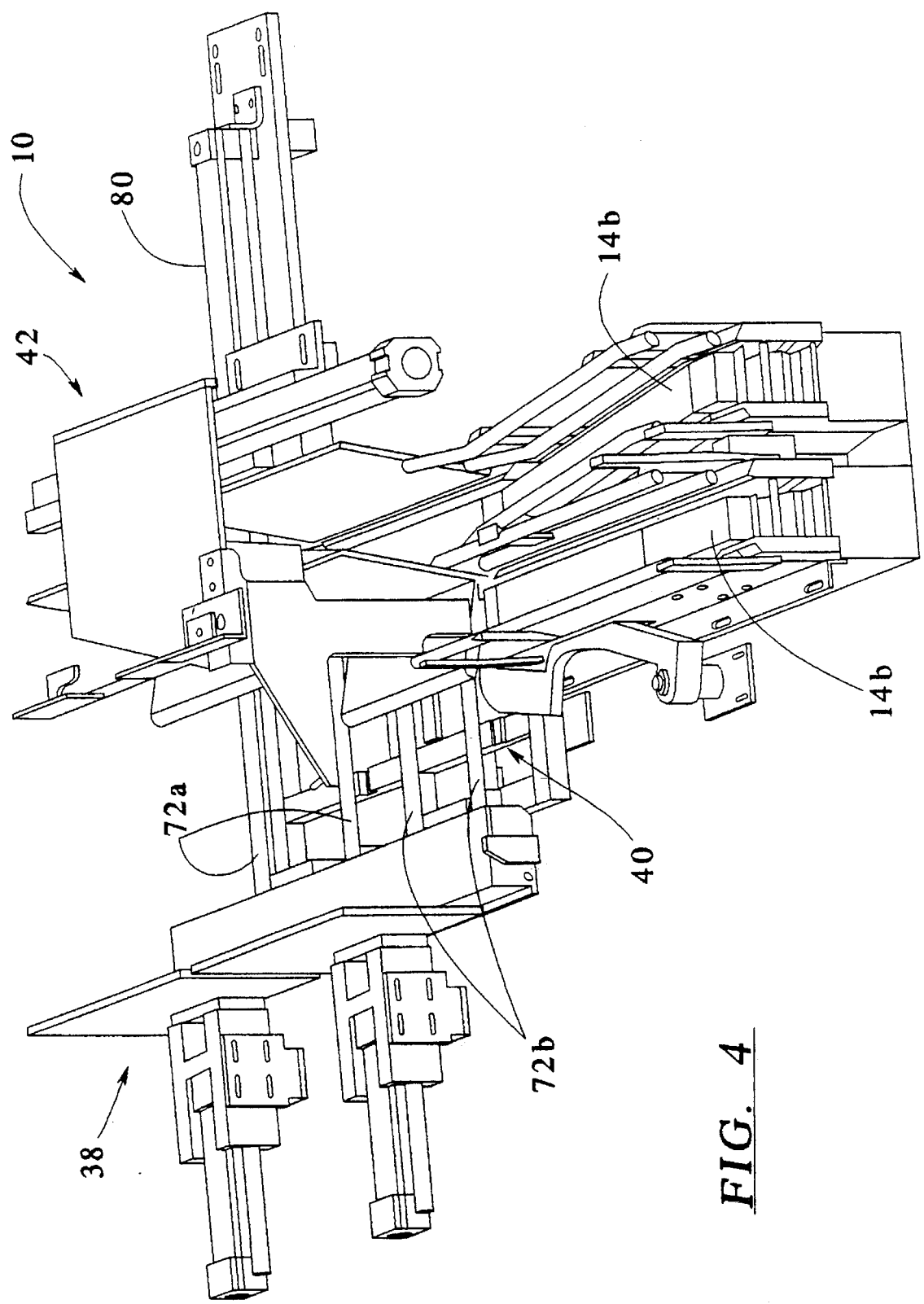
Figure 5:
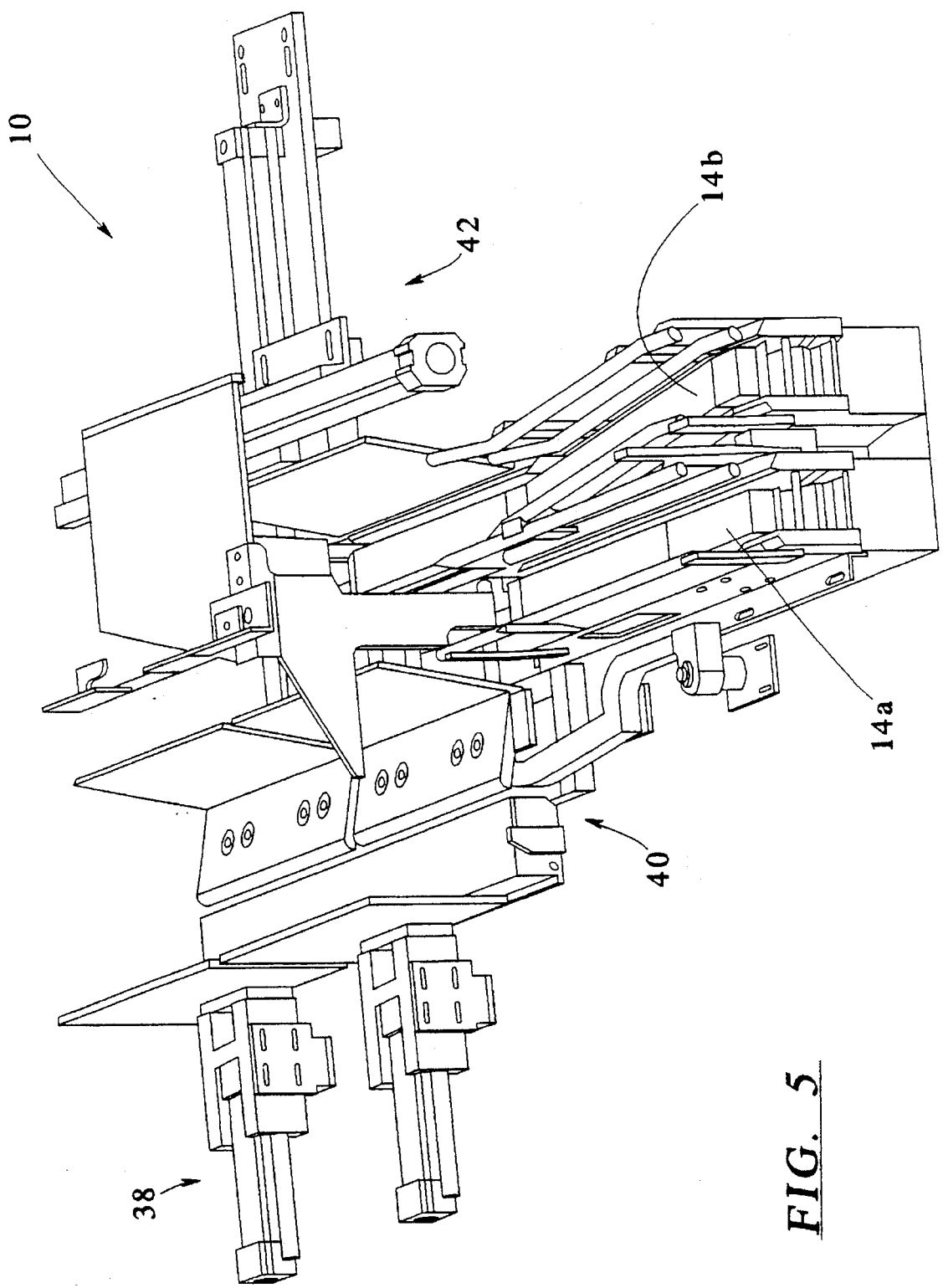
Figure 6:
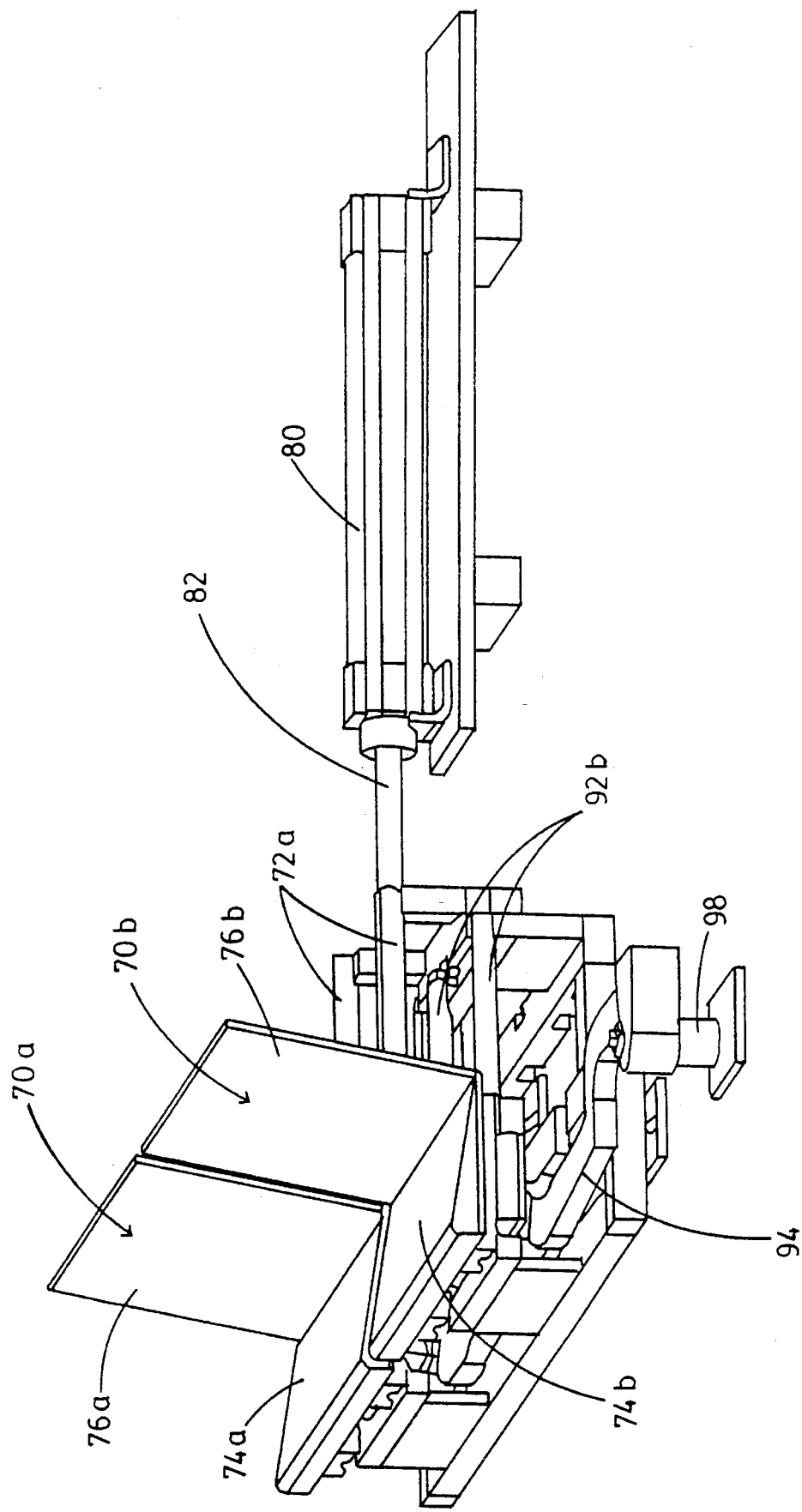
FIGS. 6 and 7 are perspective views illustrating a puller assembly at its first and second positions, respectively.
Figure 7:
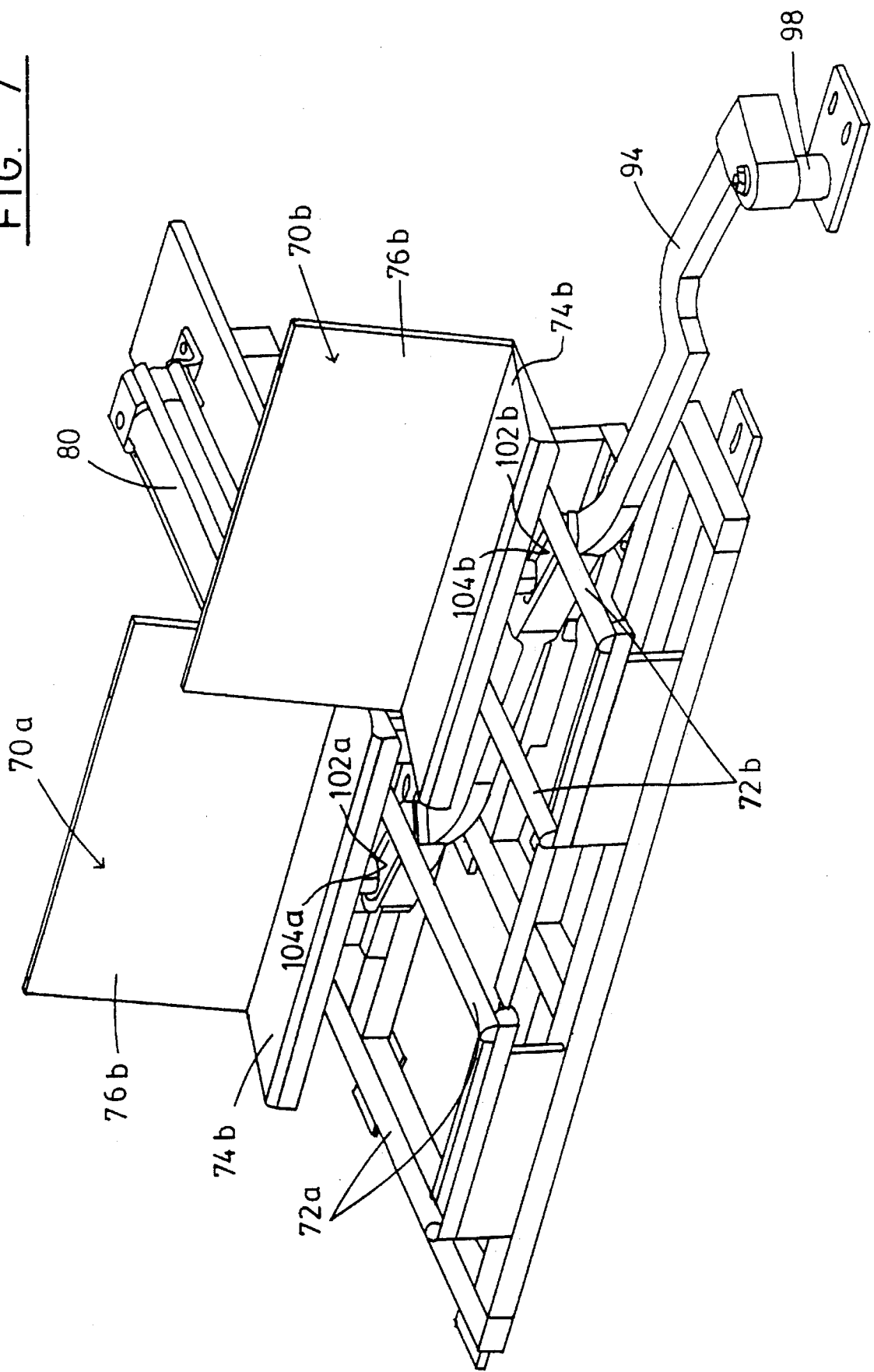

As can best be seen in FIG. 2, a pair of pneumatic cylinders 50a,50b have their piston rods 54a,54b rigidly connected to the back of respective pusher plates 46a,46b by mounting brackets 58a,58b. Pressurized air is controllably delivered to the pneumatic cylinders 46a,46b from an external source (not shown) to drive the piston rods 54a,54b, and hence the pusher plates 46a,46b, between their retracted and extended positions. The pneumatic cylinders 50a,50b are double acting air cylinders, as are well known in the art. Each pneumatic cylinder 50a,50b includes a solenoid operated valve which is responsive to a control signal for regulating the flow of pressurized air to the cylinder. A control system for delivering the control signals to the pneumatic cylinders 50a,50b is explained in greater detail below in connection with FIG. 12. The pneumatic cylinders 50a,50b further include manually adjustable flow control valves (not shown) for regulating the flow of exhaust air from the cylinders, thereby allowing adjustment of the speed at which the piston rods 54a,54b travel.

The pneumatic cylinders 50a,50b are mounted in bushings 64a,64b which are rigidly connected to the frame of the packaging machine by mounting brackets 68 (one shown). A pair of guide rods 60a,60b extend parallel to a respective piston rod 54a,54b and are slidably mounted in the bushings 64a,64b. The ends of the guide rods 60a,60b are connected to the brackets 58a,58b to support the pusher plates 46a,46b as they move between their retracted and extended positions. The pneumatic cylinders 50, guide rods 60, and bushings 64 are all commercially available from Mecman. Other commercially available components are likewise suitable for such use.

Referring additionally to FIGS. 6-9, the puller assembly 40 includes first and second puller plates 70a,70b which move between a first position (See FIGS. 1 and 6) at which the puller plates 70a,70b are adjacent the vacuum cup 25 and a second position (See FIGS. 3 and 7) at which the center axis 71a,71b of the puller plates are generally aligned along the longitudinal axis 18a,18b of respective conveyors 14a, 14b. For this purpose, each puller plate 70,70b is slidably mounted on a pair of guide rails 72a,72b extending transversely between the vacuum cup 25 and a respective outfeed conveyor 14a,14b (See FIGS. 4 and 6).

Figure 9:
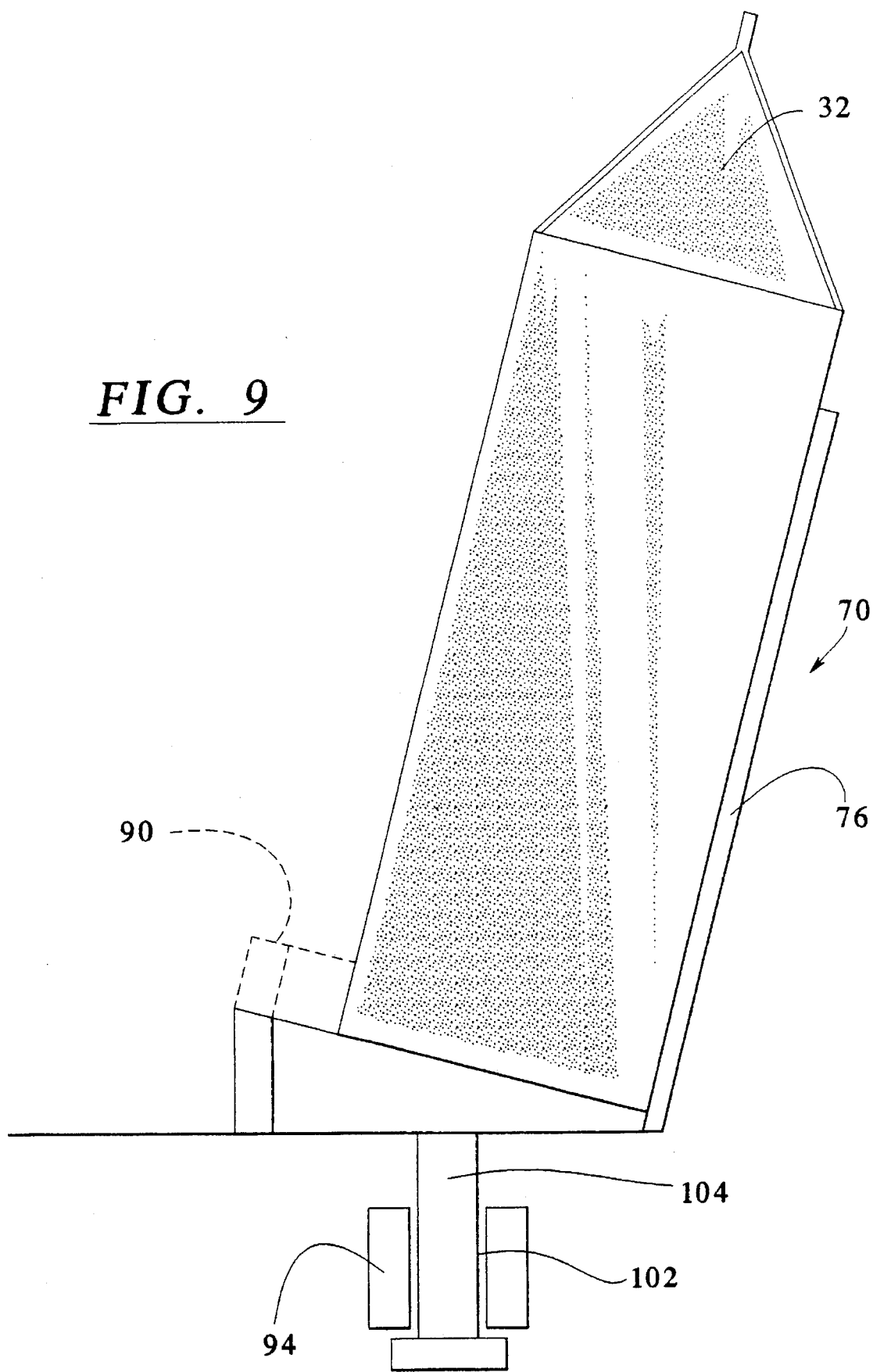
FIG. 9 is a partial sectional view of the interface between a puller plate and a link arm of the puller assembly of FIG. 6.

Each puller plate 70a,70b has a bottom panel 74a,74b adapted to support a predetermined number of canons along the center axis 71a,71b and a sidewall 76a,76b extending upwardly from one side of the bottom panel. (See FIG. 6). The sidewalls 76a,76b are generally parallel to the center axis of a respective puller plate 70a,70b so that the canons automatically align with the center axis 71a,71b as they are pushed onto the puller plates 70a,70b. The bottom panels 74a,74b may be tilted or bevelled downward towards the sidewalls 76a,76b, as is shown in FIG. 9. Tilting the bottom panel 74a,74b helps secure the cartons against the sidewalls 76a,76b as the puller plates 70a,70b move towards the conveyors 14a,14b. A lip 90 can be provided along the open side of the puller plate 70 so that the cartons "drop" into the puller plate and are held in place between the lip 90 and the sidewall 76.

The sidewalls 76a,76b support the cartons during movement of the puller plates 70a,70b and also to prevent the cartons from tipping over when they are pushed onto the puller plates. In particular, friction between the carton 12 and the vacuum cup 25 can cause the cartons to tip towards the sidewalls 76a,76b when the pusher plates 70a,70b initially engage the cartons. As the cartons tip, however, they engage the sidewalls 76a,76b which prevent them from further tipping. The cartons straighten to an upright position as the pusher plates 46a,46b move to the extended position.

A single pneumatic cylinder 80 (See FIG. 6) moves both of the puller plates 70a,70b along the guide rails 72a,72b. The pneumatic cylinder 80 is generally similar to those previously described and, hence, it will not be described in detail.

The piston rod 82 from the pneumatic cylinder 80 is connected to the first puller plate 70a for driving the first puller plate 70a between its first and second positions. A link 94 connects the second puller plate 70b to the first puller plate 70a for movement therewith. The link 94 has one end pivotally connected to the base by a rotating bearing 98. The other end of the link 94 includes a first longitudinal slot 102a slidably engaging a first pin 104a extending from the bottom of the first puller plate 70a. Similarly, the middle portion of the link 94 has a second longitudinal slot 104b slidably engaging a second pin 104b extending from the bottom of the second puller plate 70b. The interface between the slots 102 and the pins 104 can best be seen in FIGS. 7 and 9.

Figure 8:
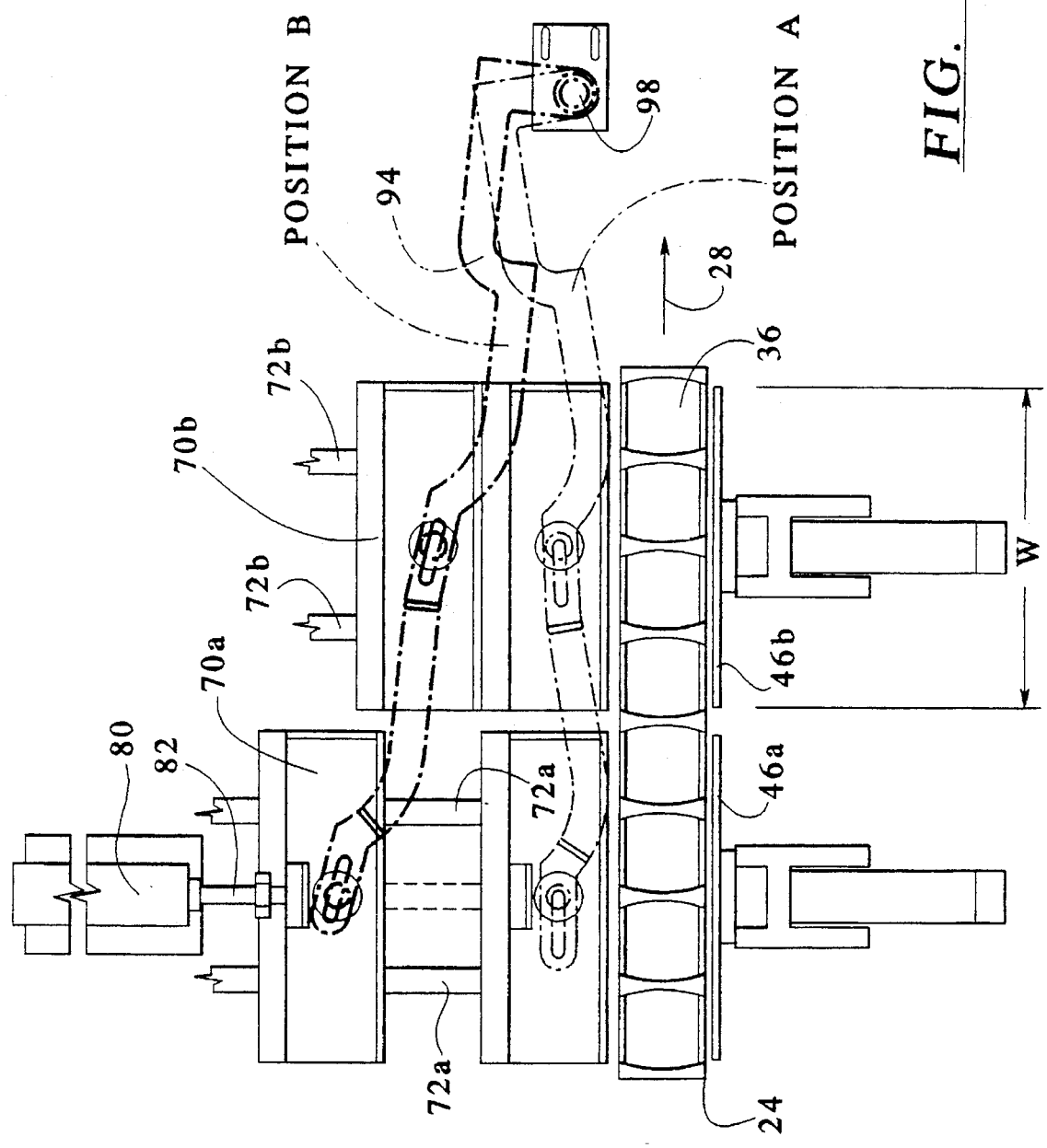
FIG. 8 is a partial top view of the transfer mechanism, illustrating operation of link used in the puller assembly.

As the pneumatic cylinder 80 drives the first puller plate 70a from its first position towards its second position, e.g., from position A to B in FIG. 8, the first pin 104a moves in the slot 102a imparting a lateral force on the link 94 and causing it to rotate clockwise about the bearing 98. Rotation of the link 94 exerts a lateral force on the second pin 102b, causing it to move the second puller plate 70b along the guide bars 72b. Conversely, when the cylinder 80 is extended to move the first puller plate 70a towards its first position, the first pin 102a imparts a lateral force on the link 94 causing it to rotate in a counterclockwise direction. As the link 94 rotates in the counterclockwise direction, it imparts a lateral force on the second pin 102b and moves the second puller plate 70b towards its first position. As can be seen in FIG. 8, the link 94 is configured so that the lateral distance traveled by the first puller plate 70a exceeds the lateral distance traveled by the second puller plate 70b. This permits a single pneumatic cylinder to be used to align both puller plates 70a,70b with a respective outfeed conveyor 14a,14b.

Figure 10:
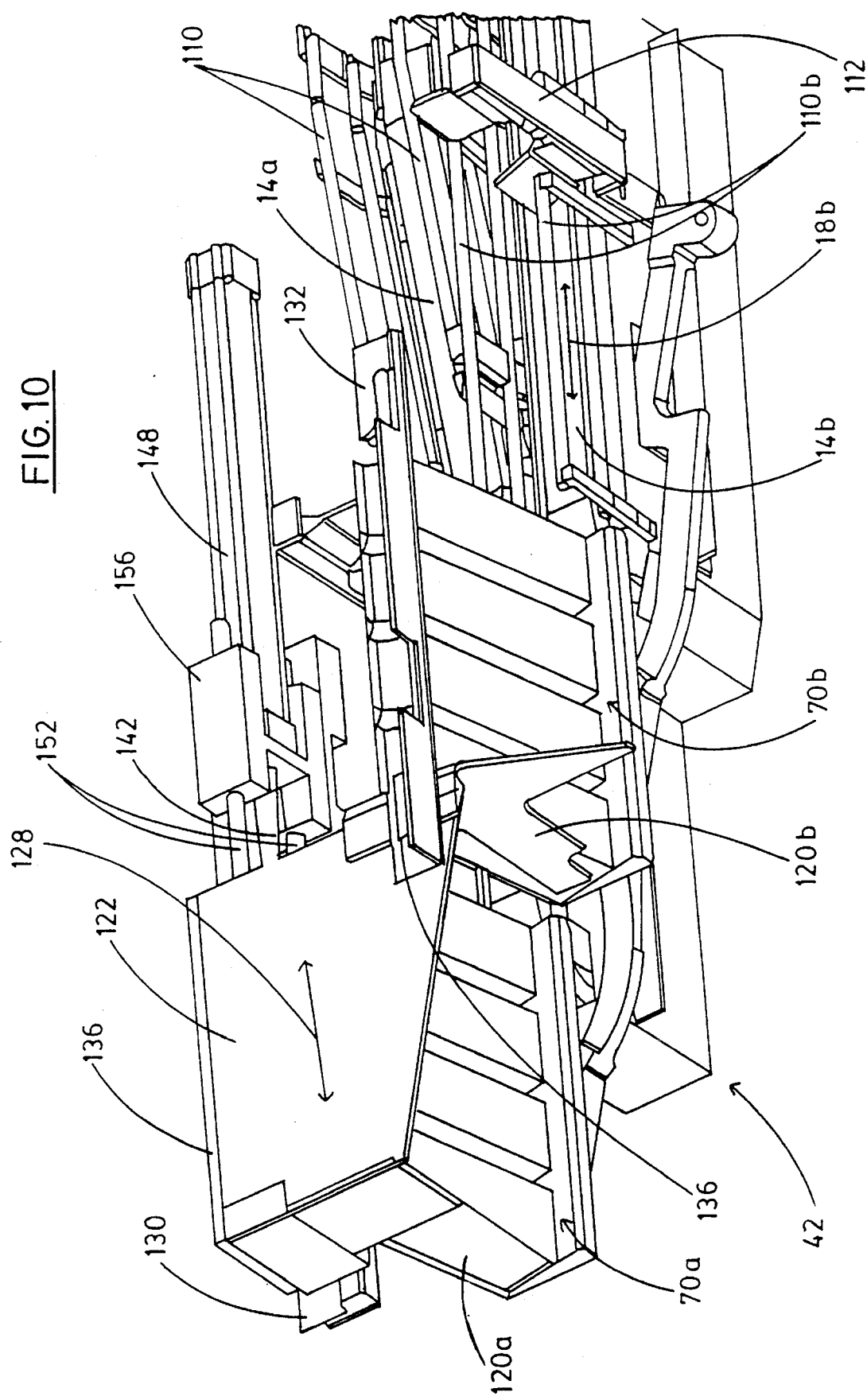
FIGS. 10 and 11 are perspective views illustrating an unloader assembly at its first and second positions, respectively.
Figure 11:
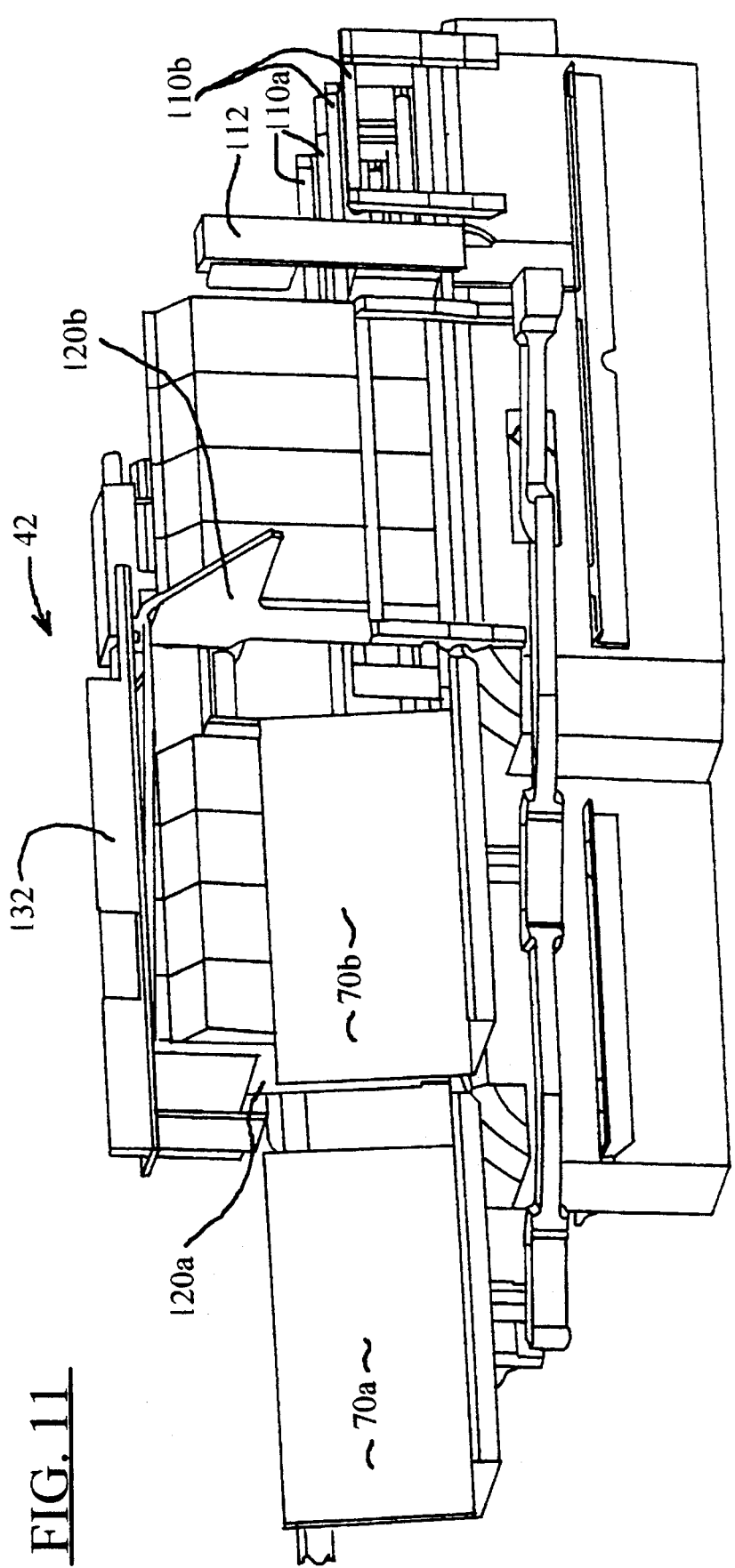

Once the puller plates 70a,70b are aligned with the conveyors 14a,14b, the unloader assembly 42, which can best be seen in FIGS. 10 and 11, engages the cartons from behind and pushes them onto the conveyors 14a,14b. The conveyors 14a,14b are equipped with upstanding guide rails 110a,110b which direct the cartons onto the conveyors 14a,14b. In addition, the conveyors 14a,14b may include a mechanism 112 (one shown) for preventing the cartons from tipping over as they are pushed onto the conveyors. One such mechanism is described in U.S. application Ser. No. 08/315,402 (Corporate Docket No. TRX-0092; Attorney Docket No. 10574US01), entitled "Mechanism For Preventing Tipping Of A Package Along A Conveyor Line," filed on even date herewith, the disclosure of which is hereby incorporated by reference.

The unloader assembly 42 includes first and second unloader plates 120a,120b which are adapted to push the cartons from the first and second puller plates 70a,70b, respectively, and onto the first and second conveyors 14a, 14b, respectively. The unloader plates 120a,120b are suspended from a support plate 122 which is movable in a plane above the conveyors 14a,14b. The support plate 122 moves along an axis 128 running parallel to the longitudinal axis 18a,18b of the conveyors 16a,16b. The unloader plates 120a,120b are movable between a first position (FIG. 10) at which the plates 120a,120b are distally located from the conveyors 14a,14b and a second position (See FIG. 11) at which the unloader plates 120a,120b are adjacent to the conveyors 14a,14b. The unloader plates 120a,120b are mounted on the support plate 122 so that they travel along the axis 18a,18b of a respective conveyor 14a,14b as they move between their first and second positions. When the unloader plates 120a,120b are moved from their first position towards their second position, they initially engage the most distal carton on a respective puller plate 70a,70b. As the unloader plates 120a,120b continue moving towards the conveyors 14a,14b, they move along the puller plates 70a, 70b and sequentially push the cartons onto the conveyors 14a,14b.

A pair of brackets 130,132, are positioned on opposite sides of the support plate 122 to support the plate 122 as it travels between the first and second positions. One bracket 132 is positioned below the support plate 122 to slidably engage a downwardly extending sidewall 136 on the support plate 122. A second bracket 132 is positioned above the support plate 132, opposite the first bracket 130. A transverse flange 138 extending from the top of the support plate 122 slidably engages the top face of the second bracket 132 as it moves between the first and second positions.

The piston rod 142 of a fourth pneumatic cylinder 148 is connected to the support plate 122 for moving it, and hence the unloader plates 120a,120b, between their first and second positions. The pneumatic cylinder 148 is mounted in a bushing 156 which is rigidly connected to one end of the first support bracket 130. A pair of guide rods 152 are slidably mounted in bushing 156 and extend parallel to the piston rod 142. The ends of the guide rods 152 are connected to the support plate 122 to further support the plate 122 as it moves along the bracket 150. The pneumatic cylinder 148 is similar to those discussed above, and it will not be described in greater detail.

As can be appreciated from the above description, the transfer mechanism is redundant in that it includes two cooperating transfer units, each of which transfers one-half of the cartons from the vacuum cup 25 and onto one of the outfeed conveyors 14a,14b. A redundant system may be employed where the output rate of the final forming mechanism exceeds the speed of the conveyors 14a,14b. Such a design is also beneficial in situations where containers need to be routed to multiple locations in the facility. It should be noted, however, that the transfer mechanism 10 could readily be adapted for use with a single outfeed conveyor by eliminating the link 94 and connecting the first and second puller plates 70a,70b to move as a single, parallel unit. In such a configuration, one of the unloader plates 120a,120b could also be eliminated.

Figure 12:
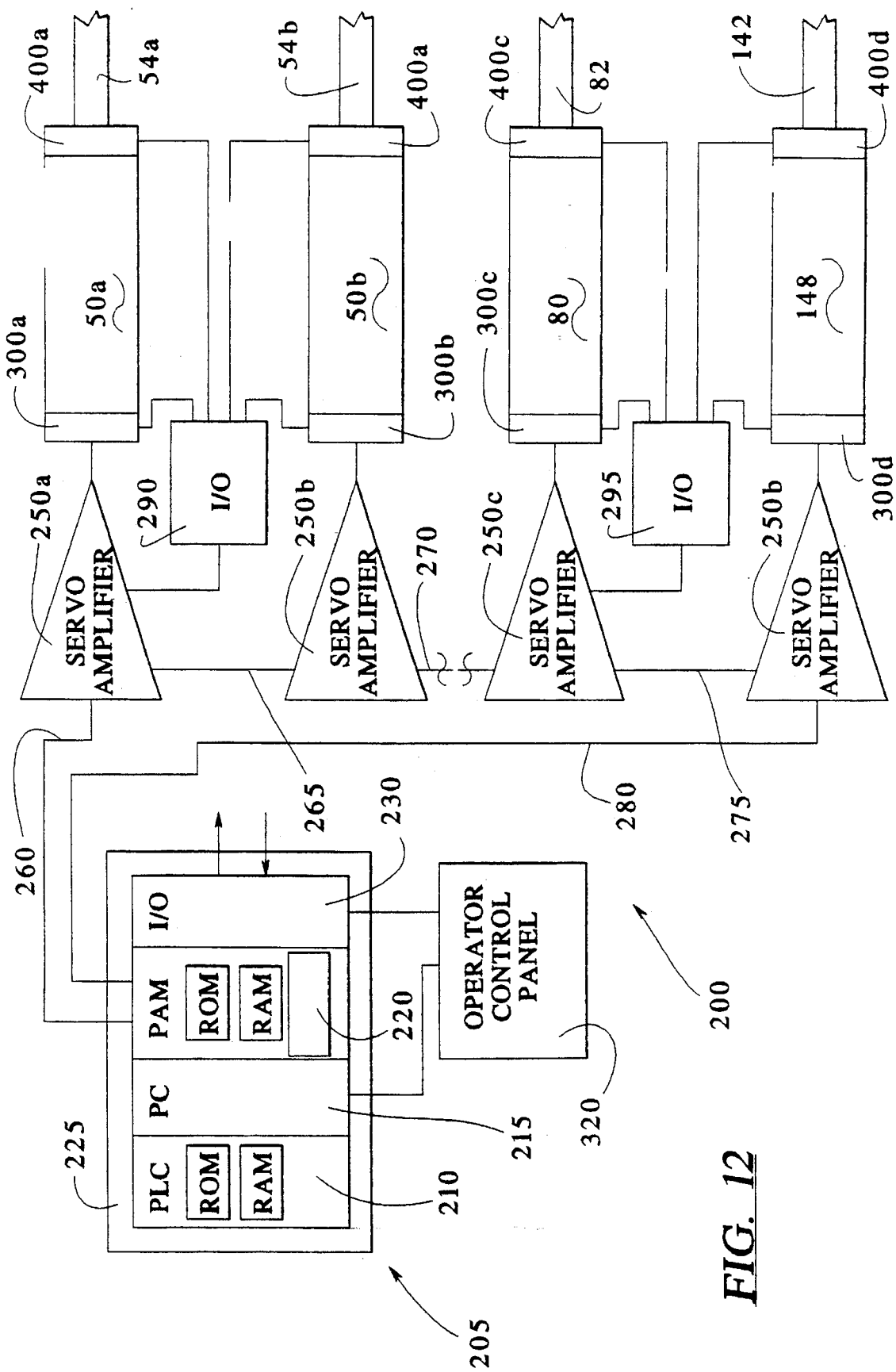
FIG. 12 is a schematic block diagram of one type of control system for controlling operation of the transfer mechanism.

FIG. 12 is a schematic block diagram illustrating one embodiment of a control system suitable for controlling operation of the pneumatic cylinders 50a,50b,80, 148. The control system 200 includes a programmable electronic control 205 as is described in greater detail in U.S. application Ser. No. 08/315,414(Corporate Docket No. TRX-0126; Attorney Docket No. 10623US01), entitled "Control System for a Packaging Machine", filed on even date herewith, the disclosure of which is hereby incorporated by reference. The control unit 205 includes a programmable logic controller ("PLC") 210, an industrial PC 215, and a programmable axis manager ("PAM") 220, all of which are connected for communication with one another in a VME bus rack 225.

The control system components may be selected from any number of commercially available products, the specific interconnection being dependent on the products selected and, further being within the skill of those familiar with such servocontrol systems. For example, the PLC 210 may be a Model 9070 manufactured by GE Fanuc. The PAM 220 may be, for example, a PAM available from GE Fanuc.

The electronic control 205 is connected via an input/output ("I/O") 230 to communicate control signals to various components throughout the packaging machine. The PAM 220, in particular, is connected to a plurality of servo amplifiers 250a–250d via respective lines 260–280 that may, for example, be an optical ring network. The servo amplifiers 250a–250d are in turn connected to control servomotors (not shown) that drive other mechanisms within the packaging machine. The servo amplifiers 250a–d may be, for example, Model ST-1 amplifiers available from Socapel. When an ST-1 servo amplifier is utilized, the servo amplifiers may include I/O cards respectively associated therewith. The solenoid operated valves 300a–300d in different ones of the pneumatic cylinders 50a, 50b, 80, 148 through I/O cards 290, 295 associated with the servo amplifiers 250a–250d. In the alternative, the solenoid operated valves 300a–300d could be directly connected to electronic control 205 through the I/O interface unit 230. The electronic control 205 receives instructions from the PLC 210 to activate the pneumatic cylinder 50a,50b,80, 148 in accordance with a predetermined sequence to effect transfer of the cartons from the vacuum cup 25 and onto the conveyors 14a,14b.

Figure 13:
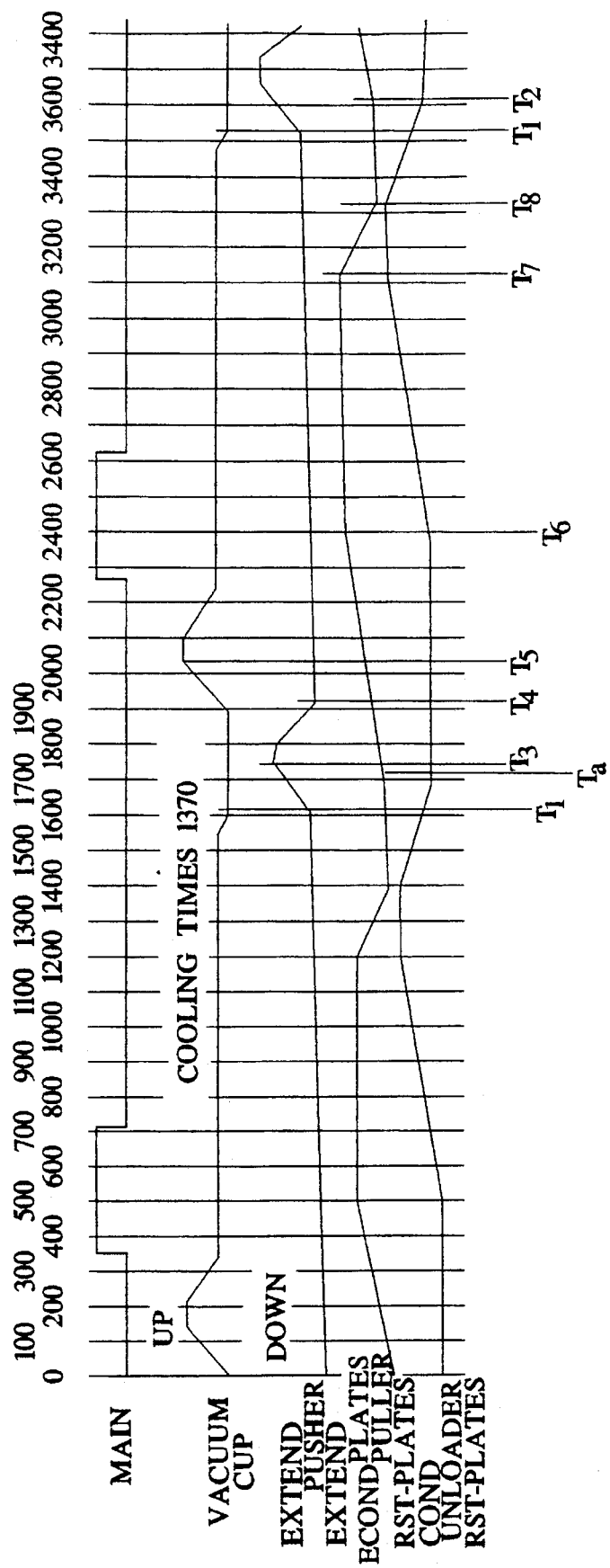
FIG. 13 is a timing chart that can be used in the control system of FIG. 12.

One manner of operation of the transfer mechanism 10 will now be described with reference to the timing diagram shown in FIG. 13, along with reference to FIGS. 1-6 which illustrate the transfer mechanism 10 at different stages during an operation cycle. At time T1, the vacuum cup 25 is lowered to position the cartons between the pusher plates 46a,46b and the puller plates 70a,70b (See FIG. 1 ).

Shortly thereafter, the first and second pneumatic cylinders 50a, 50b are simultaneously extended to drive the pusher plates 46a,46b towards their extended position. As the pusher plates 46a,46b move across the vacuum cup 25, they engage the cartons and push them onto the first and second puller plates 70a,70b. The pusher plates 46a,46b reach their fully extended position at time T3. (See FIG. 2). The puller plates 70a,70b begin moving towards their second position at a time T2, just prior to full extension of the pusher plates 46a,46b. Simultaneous movement of the pusher and puller plates 46a,46b, 70a, 70b eases transfer of the canons from the vacuum cup 25 to the puller plates and reduces the likelihood that the cartons will tip over during transfer.

Shortly after the cartons are transferred to the puller plates 70a,70b, the pusher plates 46a,46b are moved towards their retracted position which they reach at a time T4. Once the puller plates 46a,46b are fully retracted, the vacuum cup 25 is moved towards its raised position. The vacuum cup 25 reaches its raised position at time T5.

In the meantime, the puller plates 70a,70b continue moving laterally until they align with a respective conveyor 14a, 14b, at time T6. (See FIG. 3). Shortly thereafter, the unloader plates 120a, 120b begin moving towards their second positions. As the unloader plates 120a, 120b move towards their second position, they push the row of cartons carried by respective puller plates 70a,70b, sequentially loading the cartons onto the conveyors 14a,14b. After the unloader plates 120a,120b reach their second position at time T7 (See FIG. 4), the puller plates 70a,70b start returning to their first position which they reach at time T8. (See FIG. 5). Once the puller plates 70a,70b have returned to their first position, the unloader plates 120a,120b begin moving towards their first position which they reach at approximately T2 in the next cycle.

Returning now to FIG. 12, the electronic control 205 may also be connected to control the operation of a video monitor on an operator control panel 320 that communicates machine status information to the user. For example, the electronic control 205 may be programmed to monitor the absolute position of the piston rods 54a,54b,82, 142 in the various pneumatic cylinders 50a,50b,80, 148 to verify that the transfer mechanism is operating properly. For this purpose, each pneumatic cylinder unit 50a,50b,80, 148 is equipped with an absolute position sensor 400a–400d adapted to detect the position of a respective piston rod 54a,54b, 82, 142 and responsively produce an electrical signal which is transmitted to the electronic control 205 via the I/O cards 290, 295. Alternatively, the position sensors 400a–400d could be directly connected to the electronic control 205 through the I/0 interface unit 230.

The electronic control 205 is programmed to check the position of different ones of the piston rods 54a,54b, 82, 142 at predetermined times during each operating cycle. If a piston rod 54a, 54b, 82, 142 is not at the correct location when it is checked, it is assumed that a malfunction has occurred. One cause for such a malfunction can be tipped containers blocking movement of the transfer mechanism components. If a malfunction is detected, the electronic control 205 can be programmed to shut down the packaging machine or communicate a fault code or message to the operator control panel 320.

Although the present invention has been described with reference to a specific embodiment, those of skill in the art will recognize that changes may be made thereto without departing from the scope and spirit of the invention as set forth in the appended claims.

We claim as our invention:

1. An apparatus for transferring a plurality of containers carried by a support surface onto a continuously moving conveyor distally located from the support surface, comprising:

a) a puller plate adapted to support a plurality of containers along a row running parallel to the conveyor, the puller plate being movable between a first position adjacent to the support surface and a second position at which the row of cartons carried by the puller plate align with the conveyor;

b) a pusher plate movable across the support surface between a retracted position at which the containers carried by the support surface are positioned between the pusher plate and the puller plate and an extended position proximal to the puller plate first position;

c) an unloader plate movable along the puller plate when the puller plate is at its second position, the unloader plate being movable between a first position distal to the conveyor and a second position proximal to the conveyor; and d) means for moving the pusher plate from its retracted position to its extended position to push a row of cartons onto the puller plate, moving the puller plate from its first position to its second position to align the row of cartons with the conveyor and moving the unloader plate from its first position to its second position to sequentially push the row of cartons carried by the puller plate onto the conveyor;

e) software programmable control means for coordinating movement of the means for moving, said software programmable control means including a motion cycle comprising
   (i) driving the pusher plate from its retracted position to its extended position to remove the containers from the support surface onto the puller plate,
   (ii) driving the puller plate from its first position to its second position as the pusher plate drives the containers from the support surface onto the puller plate, movement of the puller plate being coordinated by the software programmable control means so that the puller plate begins moving from its first position to its second position at a time prior to the time at which the pusher plate reaches its extended position,
   (iii) driving the unloader plate from its first position to its second position to thereby drive the containers from the puller plate onto the conveyor.

2. An apparatus as set forth in claim 1, wherein the means for moving comprises a plurality of pneumatic cylinders.

3. An apparatus as set forth in claim 1, further comprising means for detecting tippage of a container during transfer between the support surface and the conveyor.

4. An apparatus as set forth in claim 1, wherein:
a) the puller plate includes:
   i) a bottom panel adapted to support a preselected number of containers; and
   ii) a sidewall extending upwardly from one edge of the bottom panel in a plane parallel to the conveyor; and
b) movement of the pusher plate to its extended position pushes a plurality of cartons onto the puller plate and against the sidewall to align the cartons in a row running parallel to the conveyor.

5. An apparatus for transferring a plurality of containers from a support surface to a first and second continuously moving conveyors, the first and second conveyors being distally located from the support surface and running along first axis and second axis, respectively, the apparatus comprising:

a) a first puller plate adapted to support a plurality of containers along a row running parallel to the first axis, the first puller plate being movable between a first position adjacent to the support surface and a second position at which the row of cartons carried by the first puller plate align with the first axis;

b) a second puller plate adapted to support a plurality of containers along a row running parallel to the second axis, the second puller plate being movable between a first position adjacent to the support surface and a second position at which the row of cartons carried by the second puller plate align with the first axis;

c) at least one pusher plate movable across the support surface between a retracted position at which a portion of the containers carried by the support surface are positioned between the pusher plate and the puller plates and an extended position proximal to the first position of the puller plates;

d) a first unloader plate movable along the first puller plate when the first puller plate is at its second position, the unloader plate being movable between a first position distal to the first conveyor and a second position proximal to the first conveyor;

e) a second unloader plate movable along the second puller plate when the second puller plate is at its second position, the unloader plate being movable between a first position distal to the second conveyor and a second position proximal to the second conveyor; and f) means for moving the pusher plate from its retracted position to its extended position to push a plurality of cartons from the support surface to the puller plates, moving the puller plates from their first position to their second position to align the row of cartons carried by the first puller plate with the first conveyor and the row of cartons carried by the second puller plate with the second conveyor, and moving the unloader plates from their first position to their second position to sequentially push the rows of cartons carried by the first and second puller plates onto the first and second conveyors, respectively.

6. An apparatus as set forth in claim 5, wherein the means comprises a plurality of pneumatic cylinders.

7. An apparatus as set forth in claim 6, wherein the means further comprises a programmable electronic control connected to control operation of the pneumatic cylinders.

8. An apparatus as set forth in claim 5, wherein the means comprises:

a) a pneumatic cylinder connected to the first puller plate for controllably moving the first puller plate between its first and second positions; and b) a link arm connecting the second puller plate to the first puller plate and being configured to move the second puller plate between its first and second positions in response to movement of the first puller plate between its first and second positions.

9. An apparatus as set forth in claim 5, wherein a) the first puller plate includes a bottom panel adapted to support a preselected number of containers and a sidewall extending upwardly from the bottom panel in a plane parallel to the first axis;

b) the second puller plate includes a bottom panel adapted to support a preselected number of containers and a sidewall extending upwardly from the bottom panel in a plane parallel to the second axis.

10. An apparatus for transferring a plurality of containers from a support surface onto a first and second continuously moving conveyors, the first and second conveyors being distally located from the support surface and running along first axis and second axis, respectively, the apparatus comprising:

a) a first guide assembly extending between the stationary surface and a location proximal to the first conveyor;

b) a second guide assembly extending between the stationary surface and a location proximal to the second conveyor;

c) a first puller plate having a bottom panel being adapted to support a preselected number of containers and a sidewall extending upwardly from the bottom panel in a plane parallel to the first axis, the first puller plate being movable along the first guide assembly between a first position adjacent the support surface and a second position at which the first puller plate aligns with the first conveyor;

d) a second puller plate having a bottom panel adapted to support a preselected number of containers and a sidewall extending upwardly the bottom panel parallel to the second axis, the second puller plate being movable along the second guide assembly between a first position adjacent the support surface and a second position at which the second puller plate aligns with the second conveyor;

e) a first pusher plate positioned adjacent the support surface, opposite the first puller plate;

f) a second pusher plate positioned adjacent the support surface, opposite the second puller plate;

g) a third guide assembly positioned in a plane above the first and second conveyors and having a support member movable along an axis running parallel to the first and second axis;

h) a first unloader plate connected to the support member for movement therewith between a first position distal to the first conveyor and a second position proximal to the first conveyor, the first unloader plate being adapted to engage the container's on the first puller plate and transfer them onto the first conveyor;

i) a second unloader plate connected to the support member for movement therewith between a first position distal to the second conveyor and a second position proximal to the second conveyor, the second unloader plate being adapted to engage the container's on the second puller plate and transfer them onto the second conveyor;

j) a first pneumatic cylinder connected to the first puller plate for controllably moving the first puller plate between its first and second positions;

k) a link arm connecting the second puller plate to the first puller plate and being configured to move the second puller plate between its first and second positions in response to movement of the first puller plate between its first and second positions;

l) a second pneumatic cylinder connected to the first pusher plate for controllably moving the first pusher plate in a direction transverse to the first axis to simultaneously transfer a preselected number of containers from the support surface, onto the first puller plate, and against the sidewall of the first puller plate;

m) a third pneumatic cylinder connected to the first pusher plate for controllably moving the second pusher plate in a direction transverse to the second axis to simultaneously transfer a preselected number of containers from the support surface, onto the second puller plate and against the sidewall of the second puller plate;

n) a fourth pneumatic cylinder connected to the support member for controllably moving the support member between its first and second positions; and o) control means for selectively delivering control signals to the pneumatic cylinders to control operation of the pneumatic cylinders in accordance with a predetermined sequence to effect transfer of cartons from the support surface to the conveyors.

* * * * *

UNITED STATES PATENT AND TRADEMARK OFFICE
CERTIFICATE OF CORRECTION

PATENT NO.:     5,549,191
ISSUED:         August 27, 1996
INVENTOR(S):    Kosaku Itoh, Ikuro Yokoyama,
                Richard Prochut, Jörgen Löfstedt,
                Christer Nilsson It is certified that errors appear in the above-identified patent and that said Letters Patent is hereby corrected as shown below:

IN COLUMN 1, LINE 51

Cancel "cartonss" and insert --cartons-- therefor.

IN COLUMN 1, LINE 62

Cancel "cartonss" and insert --cartons-- therefor.

IN COLUMN 1, LINE 65

Cancel "cartonss" and insert --cartons-- therefor.

IN COLUMN 1, LINE 67

Cancel "cartonss" and insert --cartons-- therefor.

IN COLUMN 2, LINE 46

Cancel "cartonss" and insert --cartons-- therefor.

UNITED STATES PATENT AND TRADEMARK OFFICE
CERTIFICATE OF CORRECTION

PATENT NO.: 5,549,191
ISSUED: August 27, 1996
INVENTOR(S): Kosaku Itoh, Ikuro Yokoyama,
Richard Prochut, Jörgen Löfstedt,
Christer Nilsson It is certified that errors appear in the above-identified patent and that said Letters Patent is hereby corrected as shown below:

IN COLUMN 2, LINE 64

Cancel "cartonss" and insert --cartons-- therefor.

IN COLUMN 2, LINE 67

Cancel "cartonss" and insert --cartons-- therefor.

IN COLUMN 4, LINE 2

Cancel "canons" and insert --cartons-- therefor.

IN COLUMN 4, LINE 6

Cancel "canons" and insert --cartons-- therefor.

IN COLUMN 4, LINE 34

Cancel "70abetween" insert --70a between-- therefor.

UNITED STATES PATENT AND TRADEMARK OFFICE
CERTIFICATE OF CORRECTION

PATENT NO.: 5,549,191
ISSUED: August 27, 1996
INVENTOR(S): Kosaku Itoh, Ikuro Yokoyama,
Richard Prochut, Jörgen Löfstedt,
Christer Nilsson It is certified that errors appear in the above-identified patent and that said Letters Patent is hereby corrected as shown below:

IN COLUMN 4, LINE 36

Cancel "70afor" insert --70a for-- therefor.

IN COLUMN 4, LINE 39

Cancel "102aslidably" insert --102a slidably-- therefor.

Cancel "104aextending" insert --104a extending-- therefor.

IN COLUMN 4, LINE 47

Cancel "70afrom" insert --70a from-- therefor.

IN COLUMN 4, LINE 55

Cancel "102aimparts" insert --102a imparts-- therefor.

UNITED STATES PATENT AND TRADEMARK OFFICE
CERTIFICATE OF CORRECTION

PATENT NO. : 5,549,191
DATED : August 27, 1996
INVENTOR(S) : Kosaku Itoh, et. al.

It is certified that error appears in the above-indentified patent and that said Letters Patent is hereby corrected as shown below:

In Column 7, Line 4

Cancel "canons" insert --cartons-- therefor.

Signed and Sealed this

Nineteenth Day of November, 1996

Attest:

BRUCE LEHMAN

*Attesting Officer*  *Commissioner of Patents and Trademarks*